United States Patent [19]

Obenschain et al.

[11] Patent Number: 4,521,075
[45] Date of Patent: Jun. 4, 1985

[54] CONTROLLABLE SPATIAL INCOHERENCE ECHELON FOR LASER

[76] Inventors: Stephen P. Obenschain, 7520 Hamlet St., Springfield, Va. 22151; Robert H. Lehmberg, 4502 Hadrian Ct., Alexandria, Va. 22310

[21] Appl. No.: 472,690

[22] Filed: Mar. 7, 1983

[51] Int. Cl.³ .................. G02B 5/18; H01S 3/13; G21B 1/00
[52] U.S. Cl. .................. 350/162.11; 372/103; 376/104
[58] Field of Search ............ 350/447, 162.2, 162.11, 350/440; 372/98, 101, 102, 103; 356/345, 352, 32; 376/104

[56] References Cited

U.S. PATENT DOCUMENTS 3,485,552  12/1969  Adler .................................. 350/356
3,670,260  6/1972   Koester et al. ...................... 372/101
4,195,913  4/1980   Dourte et al. ....................... 350/288

OTHER PUBLICATIONS

K. Mima and Y. Kato, "111-4 Spatial Coherence Reduction of Fusion Lasers for Absorption Profile Smoothing and Instability Suppression in Plasmas", *ILE Progress Report on Inertial Fusion Program*, No. 1, pp. 15–18, (issued May 1982).

*Primary Examiner*—Bruce Y. Arnold
*Assistant Examiner*—Bruce S. Shapiro
*Attorney, Agent, or Firm*—Robert F. Beers; William T. Ellis; Alan P. Klein

[57] ABSTRACT

A system for achieving very uniform illumination of a target. A beam of broadband spatially-coherent light is converted to light with a controlled spatial incoherence and focused on the target. An echelon-like grating breaks the beam up into a large number of differently delayed beamlets with delay increments larger than the coherence time of the beam, and a focusing lens overlaps the beamlets to produce at the target a complicated interference pattern modulated by a smooth envelope that characterizes the diffraction of an individual beamlet. On time scales long compared to the coherence time, the interference pattern averages out, leaving only the smooth diffraction envelope.

18 Claims, 4 Drawing Figures

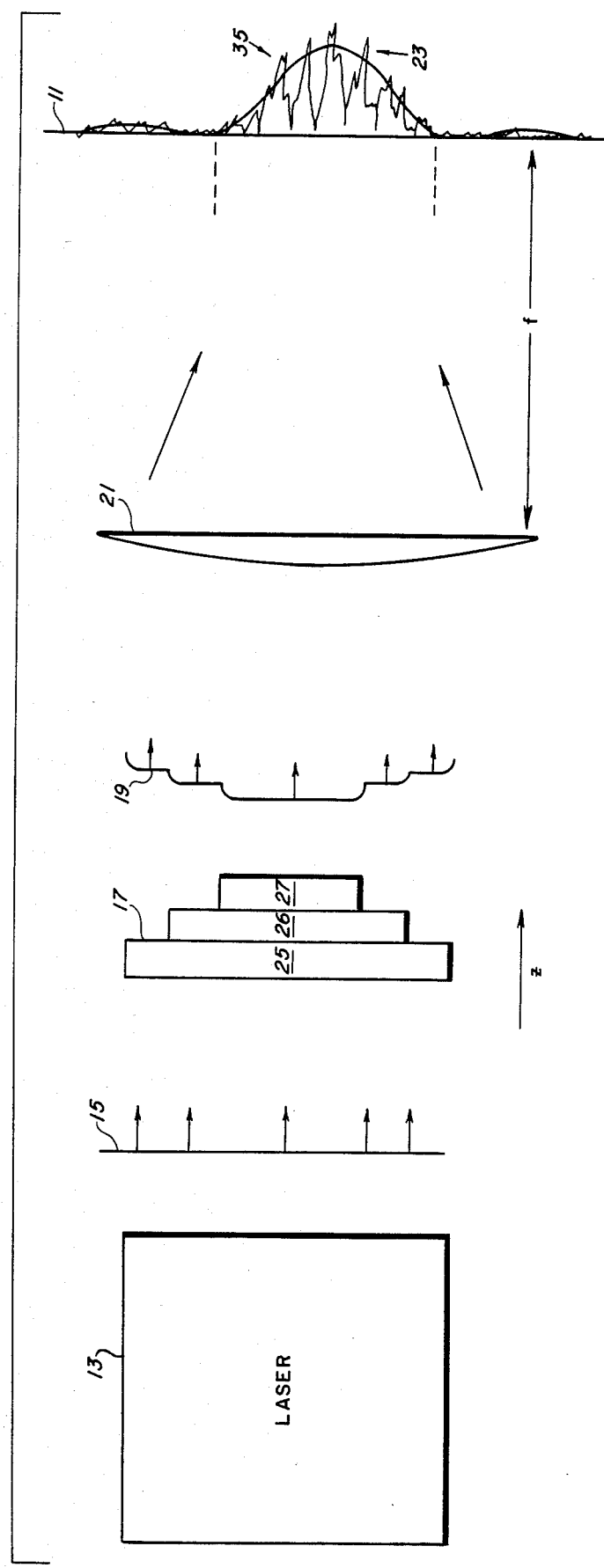

CONTROLLABLE SPATIAL INCOHERENCE ECHELON FOR LASER

BACKGROUND OF THE INVENTION

The present invention relates to optical systems and elements, and more particularly to such systems and elements for obtaining uniform illumination.

Concentrated laser light that uniformly illuminates a target surface is required in many applications of the laser-matter interaction, particularly direct-drive laser fusion. In the configurations presently used for such applications, the laser light is concentrated onto the target by a lens. In order to achieve the desired intensity and to increase the illuminated area, one normally displaces the target from the best focus (far-field) of the lens to a position where the beam is still converging (near or quasi-near field). The difficulty of maintaining good beam uniformity on the target in this focal configuration is well known, particularly in cases where high powers are required. Amplitude nonuniformities in the laser beam at the lens will be imprinted on the target unless they are spatially small enough that diffraction smooths their effects before the beam reaches the target. These amplitude nonuniformities can be caused by damage or optical imperfections in the laser. In large high power lasers, which have many components, the cumulative effect of small phase aberrations introduced by each element (even those of high optical quality) can produce large intensity nonuniformities at the laser output. These can only be partially controlled at great expense by using ultra-high quality laser components, and using telescopes to reduce the transfer of phase aberrations into amplitude nonuniformities.

Several approaches have been suggested to alleviate the uniformity problem, none of which has proven practical. One approach is to overlap many laser beams onto a target, and rely on statistical smoothing. Unfortunately, the degree of smoothing increases only as the square-root of the number of beams. Laser-fusion may require intensity uniformities of a few percent. The hundreds or perhaps thousands of laser beams required to achieve such levels of uniformity by this approach would therefore be very expensive, and probably too complicated to be practical. Optical phase conjugation techniques have also been proposed for improving laser beam quality. These techniques are effective at enhancing the ability of aberrated lasers to produce a nearly diffraction-limited focal spot; however, even small deviations from perfect conjugation tend to produce large beam nonuniformities.

In the far field region (near focus) the nonuniformities present at the laser output tend to diffract out into a low intensity halo well beyond the main focal spot, and therefore pose a much less serious problem. However, this approach would have serious difficulty in achieving the desired focal spot diameter with normal high power lasers. For the case of light at near optical wavelengths (~1 µm) and incident laser beams above 10 cm diameter, extraordinarily long focal length lenses (hundreds of meters) would be required to illuminate a millimeter section of a fusion pellet. This scheme is impractical because of the large focal lengths required, the accompanying high pointing accuracy required of the laser, and the large influence that phase nonuniformities across the laser beam would have on the focal spot diameter.

A technique has been recently proposed by Mima and Kato in *ILE Progress Report on Inertial Fusion Program*, No. 1, pp. 15–18 (May 1982) in which the laser beam is broken up by a random phase mask. In that proposal, however, the random phase relationship among the beamlets would remain fixed in time; i.e., the incident beam becomes aberrated, but not really incoherent. The focal interference pattern therefore persists throughout the pulse, and it invariably contains longer wavelength nonuniformities in the focal distribution that would be deleterious to the uniformity of the laser irradiance. Similar considerations apply to optical beam integrating devices that are designed to produce a "top hat" spatial profile such as U.S. Pat. No. 4,195,913 issued to D. Dourte et al.

SUMMARY OF THE INVENTION

It is therefore an object of this invention to obtain uniform illumination of targets by a coherent light source in an inexpensive and reliable manner.

Another object is to allow uniform or smoothly varying illumination of target surfaces by imperfect laser beams.

A further object is to achieve the laser illumination uniformity required for the direct-drive approach to laser fusion.

These and other objects of the present invention are achieved by a system including a broadband spatially-coherent source of a nonuniform light beam, and a beam-smoothing means which converts the beam to light with a controlled spatial incoherence and focuses it on a target. The beam-smoothing means breaks the beam up into a plurality of differently-delayed beamlets with delay increments larger than the coherence time of the beam (the reciprocal of its spectral bandwidth), and overlaps the beamlets at the target to produce, on time scales long compared to the coherence time of the beam, a smooth diffraction profile. The diffraction profile is relatively insensitive to amplitude and phase nonuniformities in the beam provided that the beam is uniform over the areas of the individual beamlets.

In another aspect, the invention involves a device for converting a broadband coherent light beam to light with a controlled spatial incoherence. The device includes a stack of transparent plates that are packed together to form a stairway of unequal risers.

The invention has a marked advantage over other techniques for achieving a smooth illumination profile from a coherent laser, such as the random phase plate or the Dourte integrator, in that virtually unlimited degrees of uniformity can be achieved, and the focal spot irradiance is uniform even on short spatial scalelengths. The latter advantage may be important for avoiding instabilities in laser plasma interactions, such as small scale self-focusing and stimulated Brillouin scattering. For the fusion application, one needs uniform illumination of a spherical surface. It has been shown that if the incident laser profiles are smooth, one can achieve uniform illumination of a spherical surface by overlapping a relatively small ($\gtrsim 20$) number of beams. The problem prior to this invention has been in achieving a smooth and reproducible focal profile in a single beam. The smoothing technique appears highly promising for the fusion application. It should also be applicable to other processes, such as shock wave generation, which require uniform illumination by a concentrated laser beam.

Additional advantages and features will become apparent as the subject invention becomes better understood by reference to the following detailed description when considered in conjunction with the accompanying drawings wherein:

BRIEF DESCRIPTION OF THE DRAWING

FIG. 1 is a schematic diagram of a first embodiment of the illumination system of the invention.

DESCRIPTION OF THE PREFERRED EMBODIMENTS

Figure 4:
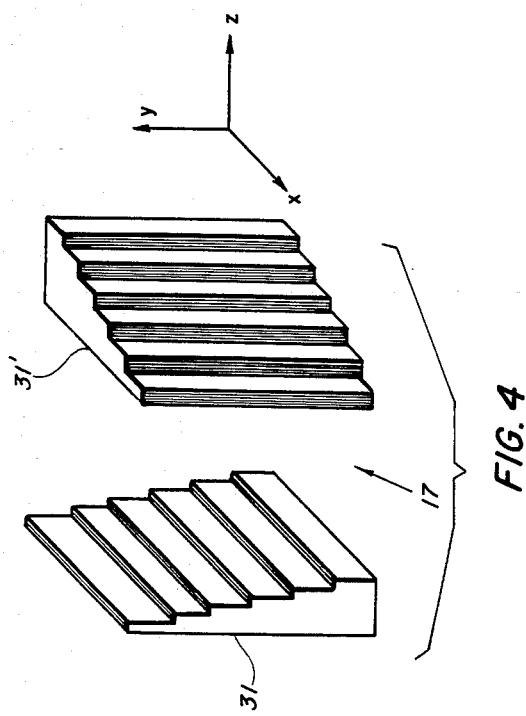
FIG. 4 is an isometric view of the diffractive means of FIG. 3.

FIG. 1 shows a system for achieving very uniform illumination of a target surface 11 by a nonuniform light beam which is generated by a broadband spatially-coherent source, such as conventional laser 13. The beam (whose wavefront is indicated at 15) is characterized by a coherence time $t_c$ which is the reciprocal of the spectral bandwidth of the light. The system includes a beam-smoothing means which converts the nonuniform beam to light with a controlled spatial incoherence, and focuses the light on the target 11. While the beam-smoothing means may take a variety of forms, conveniently it may take the form shown in FIG. 1 of a diffractive means 17 which breaks the beam into a large number of differently-delayed beamlets with delay increments larger than the coherence time $t_c$ of the beam (the wavefronts of the beamlets are indicated at 19), and a focusing means 21 which overlaps the beamlets at the target 11 to produce, on time scales long compared to the coherence time $t_c$, a smooth diffraction profile 23. The smooth diffraction profile 23 is relatively insensitive to the amplitude and phase nonuniformities in the beam, provided that the beam is uniform over the areas of the individual beamlets.

Figure 2:
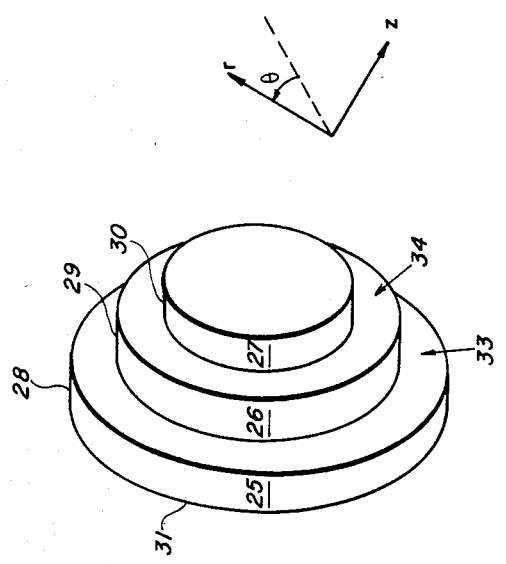
FIG. 2 is an isometric view of the diffractive means of FIG. 1.

Diffractive means 17 may comprise, for example, a stack of transparent plates 25–27 (shown in isometric detail in FIG. 2) packed together to form a minature stairway of unequal risers 28–30 whose rises are greater than $(c/(n-1))t_c$ in magnitude, where c is the speed of light, n is the index of refraction of the plates, and $Ct_c$ is the coherence length of the beam. The stack of plates 25–27 is disposed so that the base 31 of the miniature stairway lies in a plane normal to the beam direction (the z axis shown in the Figures) and is closest to the laser 13. The steps are at random elevations from the base 31 and the treads 33–34 form concentric rings. Preferably, the number of steps is much larger than unity. (For ease of illustration, only three steps have been shown in FIG. 2 but ten or more steps is desirable). The material of the plates may be glass, for example.

While the focusing means 21 may also take a variety of forms, conveniently it may take the form shown in FIG. 1 of a converging lens disposed between the diffractive means 17 and the target 11 in a plane normal to the beam direction. The lens 21 is spaced one focal length away from the target 11 and is sufficiently close to the diffractive means 17 that any diffraction of the beamlets 19 before the lens is negligible.

In operation, a nonuniform light beam from the laser 13 is directed through the base 31 of the stairway formed by the stack of transparent plates 25–27 and experiences a random time delay that decreases in the radial direction (the r axis) incrementally with each step. The resulting beam is therefore divided into a series of independent beamlets 19, one for each step of the stairway. Each independent beamlet will have a nearly uniform intensity and phase provided there are a very large number of steps within the beamwidth of the laser 13. The lens 21 mixes the beamlets in its focal plane to produce a complicated interference pattern 35 at the target 11. This pattern is modulated by a broad, smoothly-varying envelope 23 which characterizes the diffraction of the individual beamlets.

The detailed interference structure 35 is determined by the random distribution of beamlet phases. Since the rise of each riser 28–30 exceeds $(c/(n-1))t_c$, the beamlets experience incremental time delays on passing through the steps that exceed the coherence time $t_c$, and therefore the phase distribution and interference structure will change in a time $t_c$. If $t_c$ is small compared to the laser 13 pulse width and the time required for significant changes within the target 11, then the target will ignore this rapidly changing pattern and react only to the average intensity defined by the smoothly-varying envelope 23.

Figure 3:
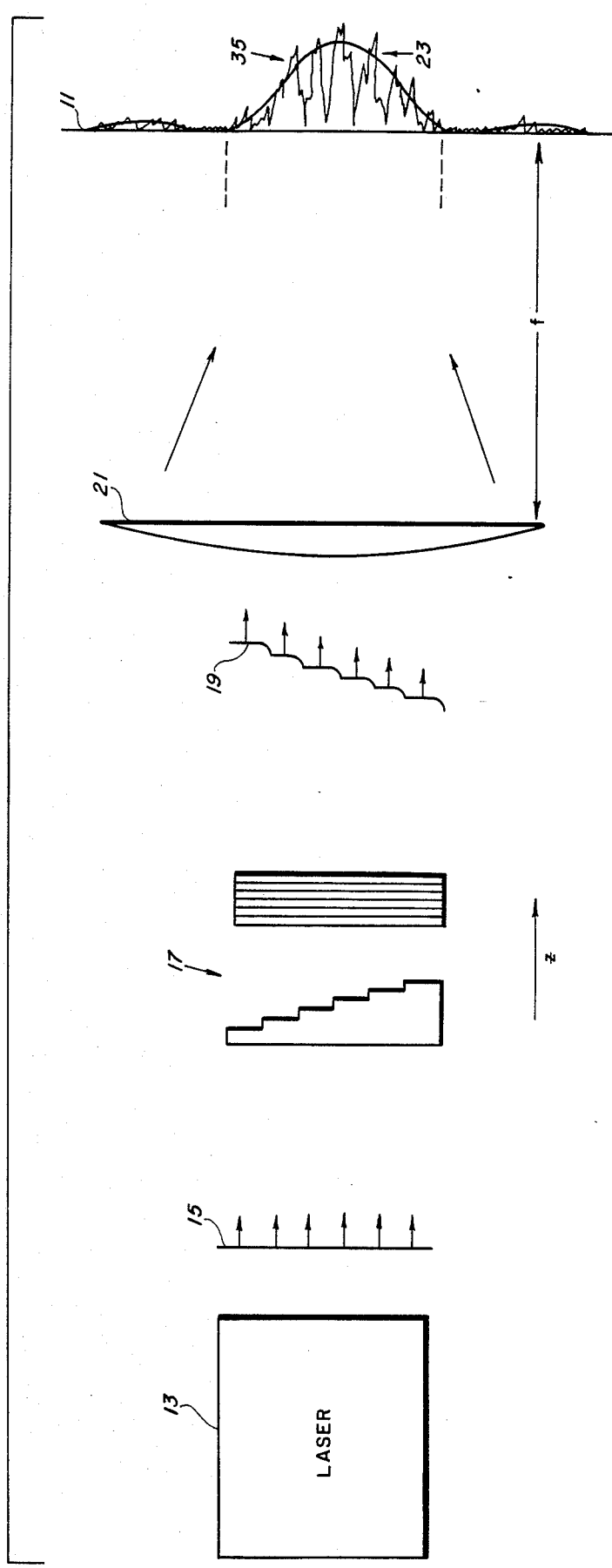
FIG. 3 is a schematic diagram of a second embodiment of the illumination system of the invention.

FIG. 3 shows a second embodiment which differs from the first in the modification of the diffractive means 17 by the placement of a second stack of plates behind the first and in the rectangular form of the step treads of the first stairway. The second track of plates (shown in isometric detail in FIG. 4) is packed together to form a miniature stairway of unequal risers like the first except that the elevation of each step from the base 31' of the second stairway is N times that of the corresponding step from the base 31 of the first stairway, where N is the number of steps of the first stairway. The second stairway is disposed with its base 31' closest to the first row of plates and is rotated by 90° around the beam axis (the z axis shown in the Figures) relative to the first stairway.

The operation of the second embodiment is the same as the first except that the nonuniform light beam from the laser 13 is directed through two stack of plates. Upon passing through the first stack of plates, the beam experiences a random time delay that decreases with each step in the y direction. Upon passing through the second stack of plates, it experiences a further random time delay that decreases with each step in the x direction.

Obviously, numerous modifications and variations of the present invention are possible in light of the above teachings. Thus, for example, while the diffractive means 17 (e.g. the stack of plates in FIG. 1) has been illustrated as diffracting light which transilluminates it, it is to be understood that the diffractive means could also be used in a reflective mode, that is, as diffracting light which is reflected from it. Also, the treads of the steps could be squares or closely-packed hexagonals. Further, the steps could be bevelled to eliminate the need for a separate lens 21. This would correspond to a coarse Fresnel lens in the first embodiment. Finally, arbitrary focal distributions can be obtained by providing the steps with varying wedges and varying the way the incoherent beamlets 19 overlap at focus. It is therfore to be understood that within the scope of the appended claims, the invention may be practiced otherwise than as specifically described herein.

What is claimed as new and desired to be secured by Letters Patent of the United States is:

1. A system for achieving very uniform illumination of a target by a nonuniform beam from a broadband spatially-coherent light source comprising:

a broadband spatially-coherent source of a nonuniform light beam, the beam being characterized by a coherence time that equals the reciprocal of its spectral bandwidth;

a stack of transparent plates packed together to form a stairway of steps for breaking up the beam into a plurality of differently-delayed beamlets with delay increments longer than the coherence time of the beam, said steps having unequal risers and disposed so that the base of the stairway lies in a plane normal to the beam direction; and focusing means for overlapping the beamlets at the target to produce, on time scales long compared to the coherence time of the beam, a smooth diffraction profile which is relatively insensitive to amplitude and phase nonuniformities in the beam provided that the beam is uniform over the areas of the individual beamlets.

2. The system recited in claim 1 wherein:
the rises of the risers are greater than $(c/(n-1))t_c$ in magnitude, where c is the speed of light, n is the index of refraction of the plates, and $t_c$ is the coherence time of the beam.

3. The system recited in claim 2 wherein:
the bases of the steps are at random elevations from the base of the stairway.

4. The system recited in claim 3 wherein:
the number of steps is much larger than unity.

5. The system recited in claim 4 wherein the focusing means includes:
a converging lens disposed one focal length away from the target.

6. A device for converting a broadband, spatially-coherent nonuniform light beam, characterized by a coherence time which equals the reciprocal of its spectral bandwidth, to light with a controlled spatial incoherence, comprising:

a stack of transparent plates packed together to form a stairway of steps, said steps having unequal risers for converting a broadband spatially-coherent nonuniform light beam to light with a controlled spatial incoherence.

7. The device recited in claim 6 wherein:
the bases of the steps are at random elevations from the base of the stairway.

8. The device recited in claim 7 wherein:
the number of steps is much larger than one.

9. The device recited in claim 8 wherein:
the treads of the steps form concentric rings.

10. A device for converting a broadband spatially-coherent nonuniform light beam, characterized by a coherence time which equals the reciprocal of its spectral bandwidth, to light with a controlled spatial incoherence, comprising a first stack of transparent plates packed together to form a first stairway of steps, said steps having unequal risers, wherein the laser of the steps are at random elevations from the base of the first stairway, the number of steps is much larger than one, and the treads of the steps are rectangles for converting a broadband spatially-coherent nonuniform light beam to light with a controlled spatial incoherence.

11. The device recited in claim 10 including:

a second stack of transparent plates packed together to form a second stairway of steps, said steps having unequal risers, which is placed behind the first stack of transparent plates.

12. The device recited in claim 11 wherein:
the bases of the steps of the second stairway are at random elevations from the base of the second stairway.

13. The device recited in claim 12 wherein:
the number of steps of the second stairway is much larger than one.

14. The device recited in claim 13 wherein:
the treads of the steps of the second stairway are rectangles.

15. The device recited in claim 14 wherein:
the elevation of the base of each step of the second stairway from the base of the second stairway is N times the elevation of the base of the corresponding step of the first stairway from the base of the first stairway, where N is the number of steps of the first stairway.

16. A device for converting a broadband spatially-coherent nonuniform light beam, characterized by a coherence time which equals the reciprocal of its spectral bandwidth, to light with a controlled spatial incoherence, comprising:

a first stack of transparent plates packed together to form a first stairway of steps, said steps having unequal risers, wherein; the bases of the steps are at random elevations from the base of the first stairway, the number of steps is much larger than one, and the treads of the steps are rectangles; and a second stack of transparent plates packed together to form a second stairway of steps, said steps having unequal risers, placed behind the first row of transparent plates, wherein; the second stairway is rotated by 90° relative to the first stairway, the bases of the steps of the second stairway are at random elevations from the base of the second stairway, the number of steps of the second stairway is much larger than one, the treads of the steps of the second stairway are rectangles, and the elevation of the base of each step of the second stairway from the base of the second stairway is N times the elevation of the base of the corresponding step of the first stairway from the base of the first stairway, where N is the number of steps of the first stairway.

17. A method for achieving very uniform illumination of a target by a nonuniform beam from a broadband spatially-coherent light source comprising the steps of:

generating a broadband spatially-coherent nonuniform light beam which is characterized by a coherence time equal to the reciprocal of its spectral bandwidth;

breaking up the beam into a plurality of differently-delayed beamlets with delay increments larger than the coherence time of the beam; and overlapping the beamlets at the target to produce, on time scales long compared to the coherence time of the beam, a smooth diffraction profile which is relatively insensitive to amplitude and phase nonuniformities in the beam provided that the beam is uniform over the areas of the individual beamlets.

18. A system for achieving very uniform illumination of a target by a nonuniform beam from a broadband spatially-coherent light source comprising:
- a broadband spatially-coherent source of a nonuniform light beam, the beam being characterized by a coherence time that equals the reciprocal of its spectral bandwidth;
- a stack of transparent plates packed together to form a series of approximate steps, said steps forming unequal optical delays, and lying in a plane normal to the beam direction;
- focusing means for overlapping the beamlets at the target to produce, on time scales long compared to the coherence time of the beam, a smooth diffraction profile which is relatively insensitive to amplitude and phase nonuniformities in the beam provided that the beam is uniform over the areas of the individual beamlets.

* * * * *